United States Patent
Dudar

(10) Patent No.: US 11,506,150 B2
(45) Date of Patent: Nov. 22, 2022

(54) SYSTEMS AND METHODS FOR IDENTIFYING DEGRADATION IN EVAPORATIVE EMISSIONS CONTROL SYSTEMS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/231,901

(22) Filed: Apr. 15, 2021

(65) Prior Publication Data

US 2022/0333557 A1    Oct. 20, 2022

(51) Int. Cl.
*F02M 25/08* (2006.01)
*B60K 15/035* (2006.01)
*B60K 15/03* (2006.01)

(52) U.S. Cl.
CPC ... *F02M 25/0818* (2013.01); *B60K 15/03504* (2013.01); *B60K 15/03519* (2013.01); *F02M 25/0836* (2013.01); *F02M 25/0854* (2013.01); *B60K 2015/03302* (2013.01); *B60K 2015/03514* (2013.01); *F02M 2025/0845* (2013.01)

(58) Field of Classification Search
CPC .......... F02M 25/0809; F02M 25/0818; F02M 25/0836; F02M 25/0854; F02M 25/089; F02M 2025/0845; B60K 15/03504; 15/03519; B60K 15/04; B60K 2015/03302; B60K 2015/03514
See application file for complete search history.

(56) References Cited

U.S. PATENT DOCUMENTS

| | | | | |
|---|---|---|---|---|
| 5,297,529 A | * | 3/1994 | Cook | F02M 25/0818 123/198 D |
| 5,398,661 A | * | 3/1995 | Denz | B60K 15/03504 123/198 D |
| 5,411,004 A | * | 5/1995 | Busato | F02M 25/0818 123/198 D |
| 5,467,641 A | * | 11/1995 | Williams | F02M 25/0809 73/49.7 |
| 5,553,577 A | * | 9/1996 | Denz | B60K 15/03504 123/520 |
| 5,878,727 A | * | 3/1999 | Huis | F02M 25/0809 123/520 |
| 6,308,559 B1 | * | 10/2001 | Davison | F02M 25/0809 73/114.39 |
| 6,321,727 B1 | * | 11/2001 | Reddy | F02M 25/0809 123/520 |
| 6,382,017 B1 | * | 5/2002 | Majkowski | F02M 25/0809 73/49.7 |
| 7,448,367 B1 | * | 11/2008 | Reddy | F02M 25/08 123/519 |
| 7,856,965 B2 | | 12/2010 | Crisan | |

(Continued)

*Primary Examiner* — John M Zaleskas
(74) *Attorney, Agent, or Firm* — Vincent Mastrogiacomo; McCoy Russell LLP

(57) ABSTRACT

Methods and systems are provided for indication of a degradation in an EVAP and/or fuel system. In one example, a method for indication of a presence or absence of a degradation in a refueling system may include vacuum pull-down and pressure bleed-up tests being carried out based on a state of submersion of a spud valve in liquid fuel in a fuel tank.

14 Claims, 6 Drawing Sheets

(56) References Cited

U.S. PATENT DOCUMENTS

| | | | |
|---|---|---|---|
| 8,397,552 B2 | 3/2013 | Jackson et al. | |
| 8,495,988 B2 | 7/2013 | Reddy | |
| 9,587,595 B2 | 3/2017 | Woods et al. | |
| 9,689,349 B2 | 6/2017 | Mastsunaga et al. | |
| 9,989,018 B2 | 6/2018 | Dudar | |
| 10,364,762 B2* | 7/2019 | Dudar | F02D 41/0032 |
| 10,982,632 B1* | 4/2021 | Martin | F02M 37/0052 |
| 11,067,013 B2* | 7/2021 | Dudar | F02M 35/10019 |
| 11,105,284 B1* | 8/2021 | Dudar | G01S 19/42 |
| 2001/0042399 A1* | 11/2001 | Dawson | F02M 25/0809 73/49.7 |
| 2002/0116102 A1* | 8/2002 | Kaiser | F02M 25/0809 701/33.8 |
| 2007/0169842 A1* | 7/2007 | King | F02M 25/089 141/302 |
| 2009/0133672 A1* | 5/2009 | Crisan | F02M 25/0818 73/49.3 |
| 2010/0064774 A1* | 3/2010 | Drane | F02M 25/0818 73/40 |
| 2010/0252006 A1* | 10/2010 | Reddy | F02M 25/0854 141/59 |
| 2011/0139130 A1* | 6/2011 | Siddiqui | F02M 25/0818 123/520 |
| 2012/0079873 A1* | 4/2012 | Jackson | G01M 3/34 73/49.3 |
| 2013/0312495 A1* | 11/2013 | Hill | G01M 3/3263 73/49.2 |
| 2013/0340887 A1* | 12/2013 | Basset | B67D 7/362 141/51 |
| 2014/0116402 A1* | 5/2014 | Horiba | F02M 25/089 123/520 |
| 2015/0159597 A1* | 6/2015 | Woods | F02M 25/0836 123/495 |
| 2015/0211952 A1* | 7/2015 | Yang | G01M 3/025 73/40.5 R |
| 2015/0275790 A1* | 10/2015 | Matsunaga | F02M 25/0809 123/519 |
| 2015/0306953 A1* | 10/2015 | Dudar | B60K 15/05 137/383 |
| 2015/0337775 A1* | 11/2015 | Dudar | F02M 25/08 123/520 |
| 2016/0144711 A1* | 5/2016 | Criel | B60K 15/03519 220/562 |
| 2016/0152132 A1* | 6/2016 | Dedeurwaerder | B60K 15/03519 180/65.21 |
| 2016/0221436 A1* | 8/2016 | Lindlbauer | F17D 5/02 |
| 2017/0198662 A1* | 7/2017 | Dudar | F02M 25/0818 |
| 2017/0356360 A1* | 12/2017 | Dudar | F02M 25/0809 |
| 2018/0072556 A1* | 3/2018 | Dudar | B60K 15/05 |
| 2018/0099859 A1* | 4/2018 | Dudar | B67D 7/342 |
| 2019/0271273 A1* | 9/2019 | Dudar | F02D 41/22 |
| 2019/0383246 A1* | 12/2019 | Dudar | F02M 26/16 |
| 2020/0063697 A1* | 2/2020 | Maclennan | F02M 59/20 |
| 2020/0070649 A1* | 3/2020 | Dudar | B60K 15/03504 |

* cited by examiner

FIG. 5

| | Diagnostic routine | Result of diagnostic routine | Inference from result of diagnostic routine |
|---|---|---|---|
| 501 | Vacuum pulldown for first diagnostic routine | Reaches target vacuum level within first threshold duration | No degradation greater than threshold size outside of cap/capless |
| 503 | | Does not reach target vacuum level within first threshold duration | Degradation greater than threshold size |
| 505 | Pressure bleed-up for first Diagnostic routine | Does not reach upper vacuum threshold within second threshold duration | No detectable degradation in fuel and/or EVAP systems |
| 507 | | Reaches upper vacuum threshold within second threshold duration | Degradation less than or equal to threshold size and/or degradation greater than threshold size at cap/capless |
| 509 | Vacuum pulldown for second diagnostic routine | Reaches target vacuum level within first threshold duration | Degradation less than or equal to threshold size |
| 511 | | Does not reach target vacuum level within first threshold duration | Degradation greater than threshold size at cap/capless |

500

SYSTEMS AND METHODS FOR IDENTIFYING DEGRADATION IN EVAPORATIVE EMISSIONS CONTROL SYSTEMS

FIELD

The present description relates generally to systems and methods for identifying a location of a degradation in an evaporative emissions control system and a fuel system.

BACKGROUND/SUMMARY

Vehicle evaporative emission control (EVAP) systems may be configured to store fuel vapors from fuel tank refueling and diurnal engine operations, and then purge the stored vapors during engine operation. For example, vaporized hydrocarbons (HCs) from a fuel tank may be stored in a fuel vapor canister packed with an adsorbent which adsorbs and stores the vapors. At a later time, when the engine is in operation, the EVAP system allows the vapors to be purged into the engine intake manifold for use as fuel. In an effort to meet stringent emissions regulations set by regulatory agencies, emission control systems may be intermittently diagnosed for the presence of degradations that may release fuel vapors to the atmosphere.

One example approach for associating degradation in an EVAP system to the refueling system is given by Jackson et al. in U.S. Pat. No. 8,397,552. Therein, Jackson et al. propose a method for identifying a large degradation within a sealed fuel system. A large degradation may be a degradation that is greater than a threshold size, which may be set by regulatory agencies in order to conform to emissions standards. The sealed fuel system may contain a fuel cap, a control orifice, and a pressure sensor which is calibrated to a diameter of the control orifice. The controller may, after detecting a prior refuel event, compare vacuum measurements from the pressure sensor to a reference vacuum that is measured across the control orifice to determine the presence of a threshold degradation. Upon identifying the threshold degradation, the method may set a diagnostic code corresponding to the threshold degradation, thereby automatically associating the threshold degradation with a sealing error of the fuel cap.

However, the inventors herein have recognized potential issues with such systems. As one example, while the proposed method of Jackson et al. may be able to associate degradation of the refilling system due to an improper seal from a fuel cap from a prior refuel event, the proposed method may not be able to distinguish between improper sealing of the fuel cap versus a large degradation due to damage in the EVAP and/or fuel systems. For example, if a degradation is indicated via the method of Jackson et al. and it is due to damage to the fuel cap, the vehicle operator may then attempt to fix the problem by further sealing the cap. However, when the indication of degradation remains, the vehicle operator can make no further inference of the location of the degradation, whether it is in the refueling system or elsewhere in the EVAP and fuel systems, based on the method of Jackson et al.

When a degradation is identified within the EVAP system, it may be difficult to identify the location of the degradation, as for example the degradation may come from improperly sealed valves, hoses, canisters, etc., within the EVAP system. Often, a large degradation in the EVAP system may be located in a refueling system coupled to the EVAP system, for example in the form of an improper seal in a fuel cap, a degradation in a fuel cap, or in the case of a capless refilling unit, an improperly functioning door within the capless refilling unit. In order to pinpoint the location of the degradation, a vehicle operator may have to take a vehicle for in-shop EVAP system degradation testing. This may often be costly and excessive in the case of a degradation within the refueling system. Hence, an onboard diagnostic routine for identifying and pinpointing degradation to the refueling system may be desirable.

As one example, the issues described above may be addressed by a method for an engine, comprising indicating a presence or an absence of a degradation at a refueling system based on a position of a spud valve within a fuel tank relative to a level of fuel in the fuel tank. In this way, a position of a degradation in the refueling system may be identified and the vehicle operator may be notified of a large degradation in the refueling system.

As one example, a method may be established for identifying degradation in the refueling system coupled to the EVAP system. Degradation within an EVAP system may be identified under two distinct entry conditions including a first condition, wherein a spud valve of a filler neck of the refueling system is submerged in fuel in a fuel tank, and a second condition, wherein the spud valve is in the vapor space of the fuel tank. In the first condition, the path from the fuel tank to a cap/capless unit of the refueling system may be solely restricted to a recirculation tube, which has an orifice of a fixed diameter, whereas in the second condition, passage from the fuel tank to the cap/capless unit may go through both the recirculation tube and the filler neck of the refilling system. The diameter of the orifice of the recirculation tube may be significantly smaller than the diameter of the filler neck.

Diagnostic routines of the EVAP and fuel systems may be conducted for identifying a threshold size of degradation opportunistically under the first and the second conditions, and the results of the diagnostic routines for both entry conditions may be compared to pinpoint potential degradation of the refueling system. For example, if there is a large degradation at the cap/capless unit, there may be a difference in the results of the first and second diagnostic routines when the spud valve is submerged in fuel versus when the spud valve is in the vapor space, as the size of the degradation indicated by the first diagnostic routine when the spud valve is submerged in fuel may be restricted by the diameter of the orifice of the recirculation tube. However, if the spud valve is in the vapor space of the fuel tank, the degradation is no longer restricted by the diameter of the recirculation tube orifice due to the path from the fuel tank to the cap/capless unit further including the filler neck and the recirculation tube, and the second diagnostic routine may then indicate a large degradation.

In this way, by comparing test results from a first diagnostic routine and a second diagnostic routine under a first condition and a second condition, a large degradation at the cap/capless unit may be identified. A technical effect of opportunistically carrying out diagnostic routines during a first condition and a second condition and comparing the results of the two is that a location of the degradation may be identified. For example, by comparing diagnostic routines under a first condition and a second condition, conditions such as a fuel cap not being secured may be identified, and the location of the degradation may then be indicated to the vehicle operator via a diagnostic trouble code (DTC). In this way, by pinpointing large degradation to the cap/capless unit of a refueling system, effort, time spent, and cost incurred at a service station for identifying a source of degradation may be significantly reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 show an example table for identifying a degradation in the EVAP and/or fuel system.

Figure 2:
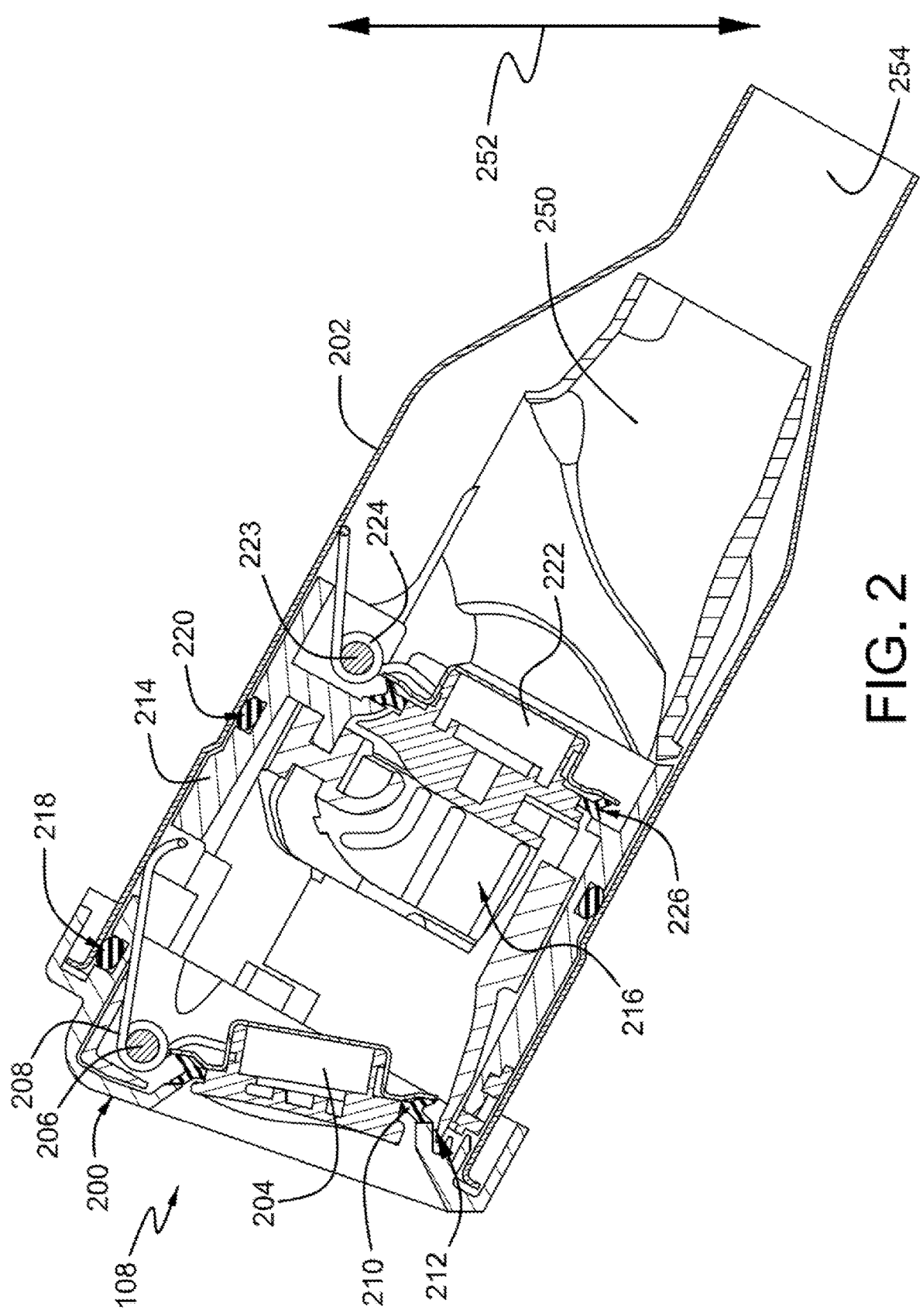
FIG. 2 shows an example embodiment of a capless refueling system for the fuel system of FIG. 1.

Note that FIG. 2 is drawn to scale, but other dimensions and configurations may be utilized without departing from the scope of this disclosure.

DETAILED DESCRIPTION

Figure 3A:
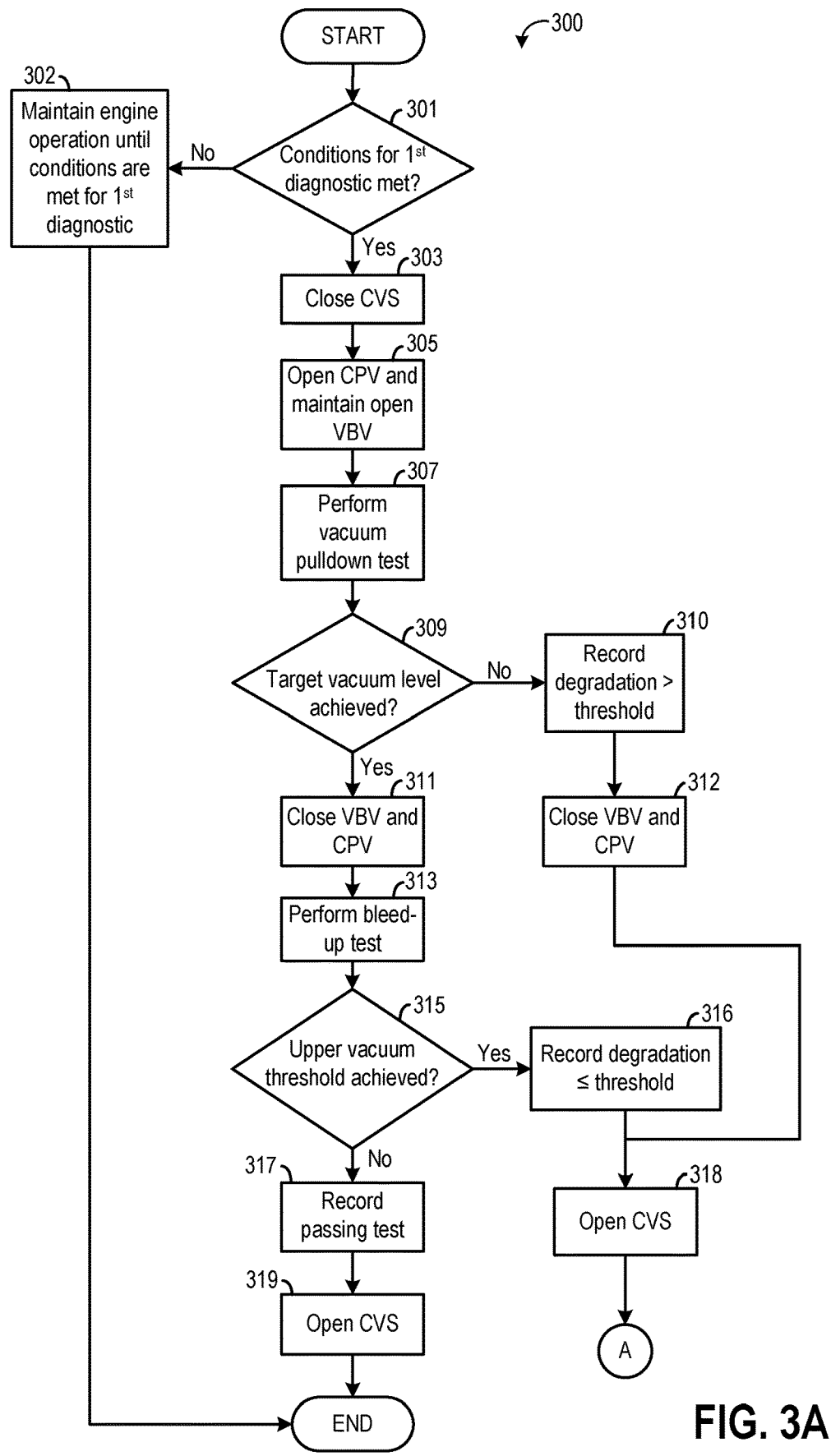
FIGS. 3A-B show a flowchart of an example method for identifying a degradation in an EVAP and/or fuel system.
Figure 3B:
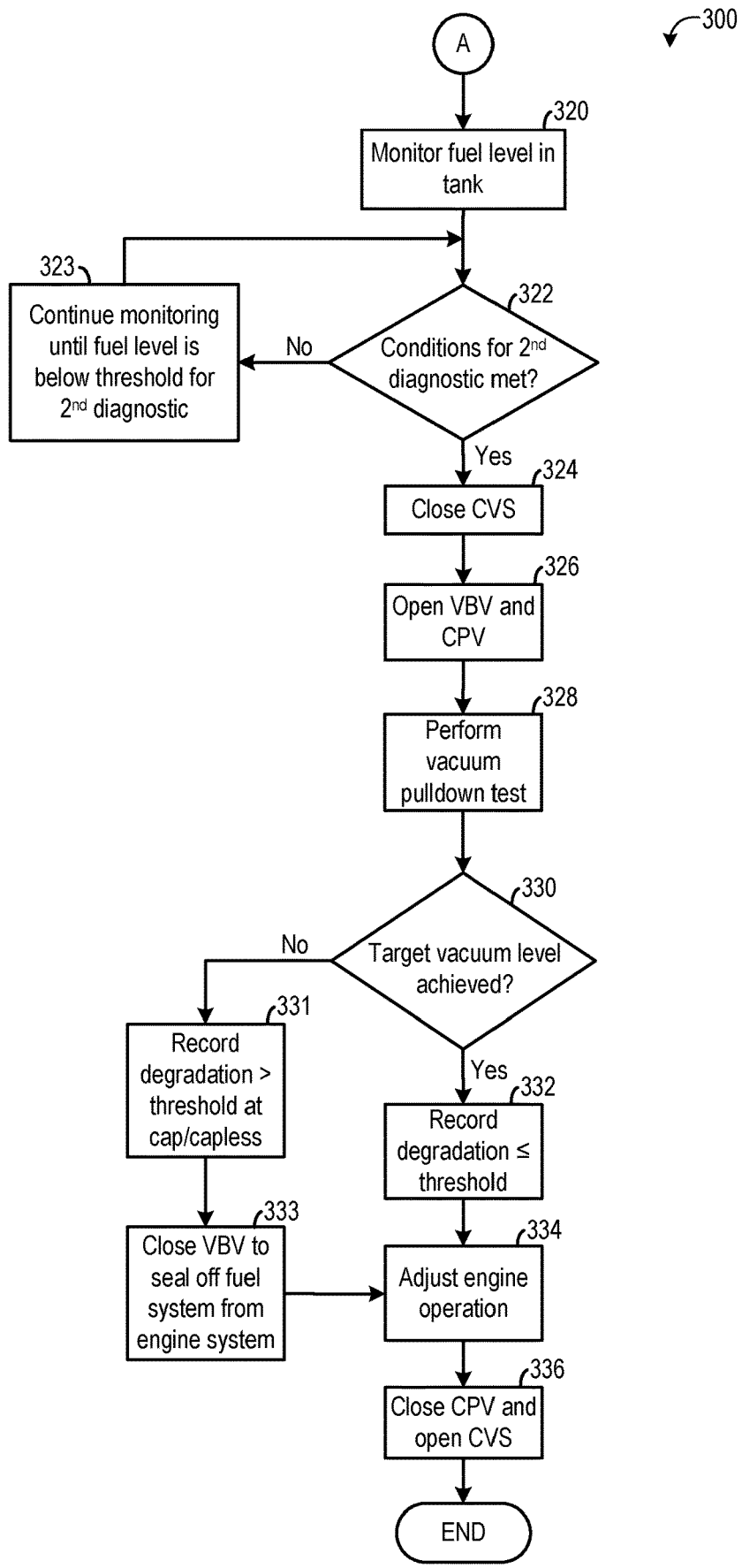
Figure 4:
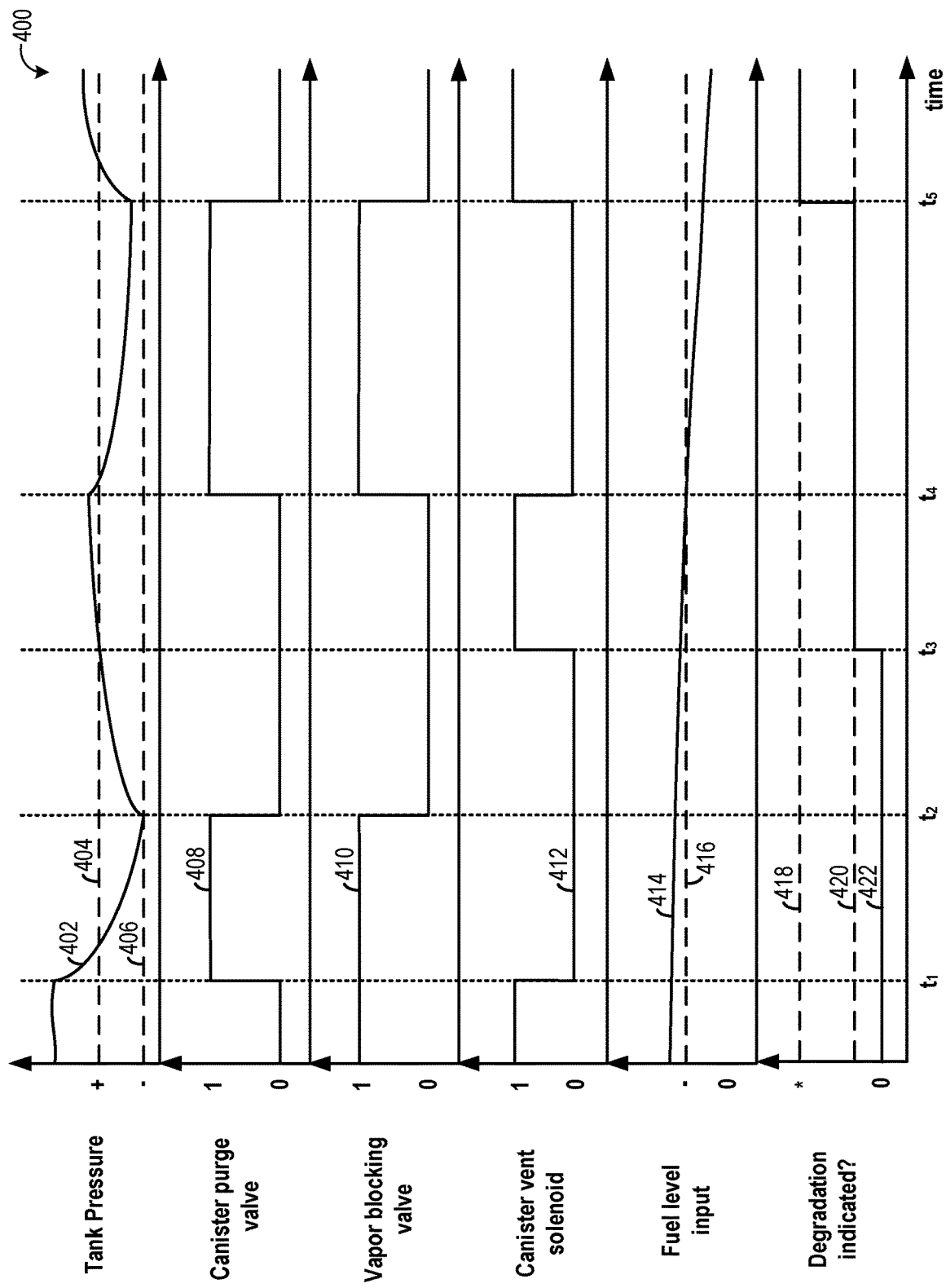
FIG. 4 shows an example timeline for identifying a degradation in the EVAP and/or fuel system, according to the present disclosure.

The following description relates to systems and methods for identification of degradation in an EVAP system. Such methods may be executed on a hybrid vehicle propulsion system, which contains an engine system coupled to a fuel system coupled and an EVAP system, shown schematically in FIG. 1. Additionally, the fuel system contains a refueling system, which may contain a fuel cap, or may be capless. An example embodiment of a capless refueling system is shown in FIG. 2. Within the systems shown in FIGS. 1-2, a method may be enacted for identifying degradation within the EVAP system by comparing results of diagnostic routines conducted under a first condition and a second condition. The first condition may include a spud valve coupled to an end of a filler neck being submerged in fuel contained in a fuel tank, while the second condition may involve the spud valve exposed to the vapor space of the fuel tank and not submerged in fuel. An example method for conducting negative pressure tests under a first condition and a second condition are given in FIGS. 3A-B, while an example operation of the method of FIGS. 3A-B is shown in FIG. 4. Results from the diagnostic routines as described in FIGS. 3A-B are tabulated in FIG. 5.

Figure 1:
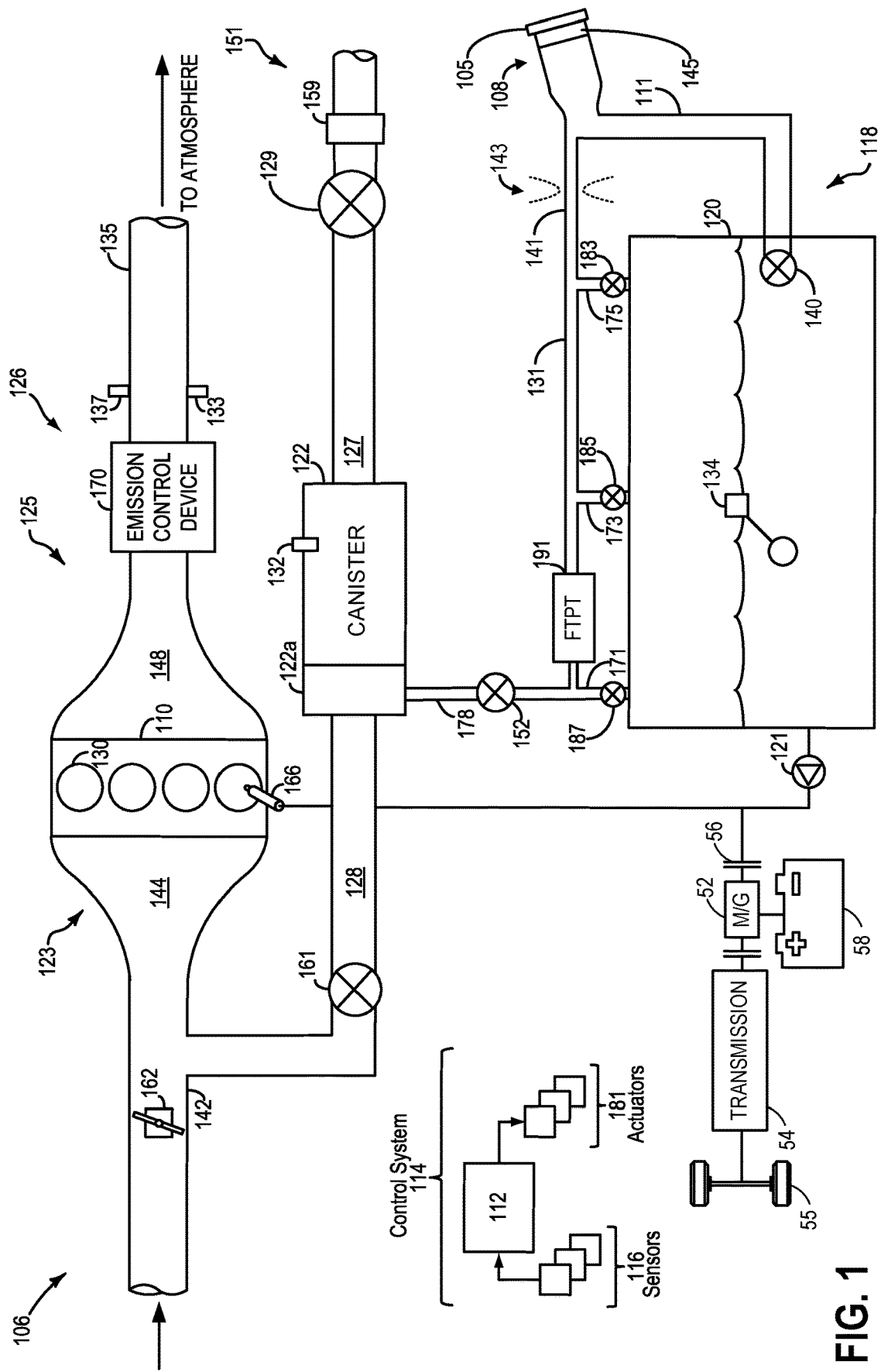
FIG. 1 schematically shows an example vehicle system with a fuel system and an evaporative emissions system.

FIG. 1 shows a schematic depiction of a vehicle system 106. The vehicle system 106 includes an engine system 126 coupled to an evaporative emissions control (EVAP) system 151 and a fuel system 118. EVAP system 151 includes a fuel vapor container or canister 122 which may be used to capture and store fuel vapors. In some examples, vehicle system 106 may be a hybrid electric vehicle system.

The engine system 126 may include an engine 110 having a plurality of cylinders 130. The engine 110 includes an engine intake 123 and an engine exhaust 125. The engine intake 123 includes a throttle 162 fluidly coupled to the engine intake manifold 144 via an intake passage 142. The engine exhaust 125 includes an exhaust manifold 148 leading to an exhaust passage 135 that routes exhaust gas to the atmosphere. The engine exhaust 125 may include one or more emission control devices 170, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 118 may include a fuel tank 120 coupled to a fuel pump system 121. The fuel pump system 121 may include one or more pumps for pressurizing fuel delivered to the injectors of engine 110, such as the example fuel injector 166 shown. While a single fuel injector 166 is shown, additional injectors are provided for each cylinder. It will be appreciated that fuel system 118 may be a return-less fuel system, a return fuel system, or various other types of fuel system. Fuel tank 120 may hold a plurality of fuel blends, including fuel with a range of alcohol concentrations, such as various gasoline-ethanol blends, including E10, E85, gasoline, etc., and combinations thereof. A fuel level sensor 134 located in fuel tank 120 may provide an indication of the fuel level ("Fuel Level Input", or FLI) to controller 112. As depicted, fuel level sensor 134 may comprise a float connected to a variable resistor. Alternatively, other types of fuel level sensors may be used.

Vapors generated in fuel system 118 may be routed to the EVAP system 151 which includes a fuel vapor canister 122 via vapor recovery line 131, before being purged to the engine intake 123. Vapor recovery line 131 may be coupled to fuel tank 120 via one or more conduits and may include one or more valves for isolating the fuel tank during certain conditions. For example, vapor recovery line 131 may be coupled to fuel tank 120 via one or more or a combination of conduits 171 and 173. Fuel system 118 may also include a recirculation tube 141, which may be coupled to the vapor recovery line 131 at one end and to a filler neck 111 at another end. Recirculation tube 141 may serve to recirculate vapors contained within the fuel tank 120 during refueling, which may reduce air entrainment and hence reduce vaporization inside the tank. This may allow for reduced activation of adsorbents in vapor canister 122, which may extend the longevity of the adsorbents in vapor canister 122. Recirculation tube 141 may be coupled to fuel tank 120 via conduit 175. In some examples, the diameter of an orifice 143 of the recirculation tube 141 may be of a different size than the diameter of the vapor recovery line. In typical examples, the diameter of the orifice 143 of the recirculation tube may range from 0.08" to 0.14".

Fuel system 118 may include one or more fuel tank vent valves in conduits 171, 173, or 175. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 171 may include a grade vent valve (GVV) 187, conduit 173 may include a fill limit venting valve (FLVV) 185, and conduit 175 may include a grade vent valve (GVV) 183. Further, fuel system 118 may contain a refueling system 108. In some examples, refueling system may include a fuel cap 105 for sealing off the refueling system 108 from the atmosphere. In other examples, refueling system 108 may be a capless refueling system. An example embodiment of a capless refueling system is given in FIG. 2. Refueling system 108 is coupled to fuel tank 120 via a fuel filler pipe or neck 111, and is additionally coupled to fuel tank 120 via recirculation tube 141. The filler neck 111 may also contain spud valve 140 at the end of the filler neck which is maintained in the fuel tank 120. Spud valve 140 may restrict backflow from the fuel tank 120 to the filler neck 111, due to the pressure difference between the side of spud valve 140 in fluidic contact with fuel and the side of spud valve 140 in fluidic contact with the air/fuel vapor combination contained in the filler neck 111. The coupling of recirculation tube 141 to the refueling system 108 may provide another path from the fuel tank 120 to the refueling system 108, which may allow tests for degradation of the EVAP and/or fuel system to commence even when the path from the fuel system 118 to the refueling system 108 via the filler neck 111 is blocked by liquid fuel. Said another way, the spud valve 140 may be coupled to an end of the filler neck 111 coupling the refueling system 108 to the fuel tank 120, and the refueling system 108 may be further coupled to the fuel tank 120 via a recirculation tube 141 including an orifice 143, and consequently the fuel tank 120 may be coupled to the refueling system 108 via each of the filler neck 111 and a recirculation tube 141 including the orifice 143.

Further, refueling system 108 may include refueling lock 145. In some embodiments, refueling lock 145 may be a fuel cap locking mechanism. The fuel cap locking mechanism may be configured to automatically lock the fuel cap in a closed position so that the fuel cap cannot be opened. For example, the fuel cap 105 may remain locked via refueling lock 145 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 145 may be a filler neck valve located at a mouth of filler neck 111. In such embodiments, refueling lock 145 may not prevent the removal of fuel cap 105. Rather, refueling lock 145 may prevent the insertion of a refueling pump into filler neck 111. The filler neck valve may be electrically locked, for example by a solenoid, or mechanically locked, for example by a pressure diaphragm.

In some embodiments, refueling lock 145 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 145 is locked using an electrical mechanism, refueling lock 145 may be unlocked by commands from controller 112, for example, when a fuel tank pressure decreases below a pressure threshold. In embodiments where refueling lock 145 is locked using a mechanical mechanism, refueling lock 145 may be unlocked via a pressure gradient, for example, when a fuel tank pressure decreases to atmospheric pressure.

EVAP system 151 may include one or more emissions control devices, such as one or more fuel vapor canisters 122 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. EVAP system 151 may further include a canister ventilation path or vent line 127 which may route gases out of the canister 122 to the atmosphere when storing, or trapping, fuel vapors from fuel system 118.

Canister 122 may include a buffer 122a (or buffer region), each of the canister and the buffer comprising the adsorbent. As shown, the volume of buffer 122a may be smaller than (e.g., a fraction of) the volume of canister 122. The adsorbent in the buffer 122a may be same as, or different from, the adsorbent in the canister (e.g., both may include charcoal). Buffer 122a may be positioned within canister 122 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 132 may be coupled to and/or within canister 122. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 127 may also allow fresh air to be drawn into canister 122 when purging stored fuel vapors from fuel system 118 to engine intake 123 via purge line 128 and canister purge valve (CPV) 161. For example, CPV 161 may be normally closed but may be opened during certain conditions so that vacuum from engine intake manifold 144 is provided to the fuel vapor canister for purging. In some examples, vent line 127 may include an air filter 159 disposed therein upstream of a canister 122.

Flow of air and vapors between canister 122 and the atmosphere may be regulated by a canister vent solenoid (CVS) 129. CVS 129 may be a normally open valve, so that variable bleed valve (VBV) 152 may control venting of fuel tank 120 with the atmosphere. VBV 152 may be positioned between the fuel tank and the fuel vapor canister within conduit 178. VBV 152 may be a normally open valve, which may be commanded closed by controller 112 for diagnostics, such as to develop vacuum for a negative pressure diagnostic. In such a situation, after sufficient vacuum develops in the fuel tank 120, the VBV 152 may be reopened to vent fuel vapors from the fuel tank 120 to canister 122. Fuel vapors may then be vented to atmosphere via CVS 129, or purged to engine intake system 123 via CPV 161.

Fuel system 118 may be operated by controller 112 in a plurality of modes by selective adjustment of the various valves and solenoids. For example, the fuel system may be operated in a fuel vapor storage mode (e.g., during a fuel tank refueling operation and with the engine not running), wherein the controller 112 may maintain open VBV 152 and open CVS 129 while closing CPV 161 to direct refueling vapors into canister 122 while preventing fuel vapors from being directed into the intake manifold.

As another example, the fuel system may be operated in a refueling mode (e.g., when fuel tank refueling is requested by a vehicle operator), wherein the controller 112 may maintain open VBV 152 and open CVS 129, while maintaining CPV 161 closed, to depressurize the fuel tank before allowing enabling fuel to be added therein. As such, VBV 152 may be kept open during the refueling operation to allow refueling vapors to be stored in the canister. After refueling is finished, the isolation valve may be closed.

As yet another example, the fuel system may be operated in a canister purging mode (e.g., after an emission control device light-off temperature has been attained and with the engine running), wherein the controller 112 may open CPV 161 and CVS 129 while closing VBV 152. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 112 may comprise a portion of a control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 137 located upstream of the emission control device, temperature sensor 133, fuel tank pressure transducer (FTPT) 191, and temperature sensor 132. Other sensors such as pressure, temperature, air/fuel ratio, and composition sensors may be coupled to various locations in the vehicle system 106. As another example, the actuators may include fuel injector 166, throttle 162, fuel tank isolation valve 153, pump 192, and refueling lock 145. The control system 114 may include a controller 112. The controller may receive input data from the various sensors, process the input data, and trigger the actuators in response to the processed input data based on instruction or code programmed therein corresponding to one or more routines. An example of a control routine for determining the presence of degradation in fuel system 118 and/or EVAP system 151 are described herein with regard to FIGS. 3A-B.

The method may involve detecting the presence or absence of the degradation at the refueling system 108 based on one or more of a first diagnostic routine carried out when the level of fuel in the fuel tank 120 is higher than a position of the spud valve 140 in the fuel tank 120 and a second diagnostic routine carried out when the level of fuel in the fuel tank 120 is lower than the position of the spud valve 140 in the fuel tank.

Upon enablement of the first diagnostic routine, the first diagnostic routine may include closing the CVS housed in a vent line of the EVAP system 151, maintaining open the VBV 152 housed in a fuel vapor line coupling the fuel tank to a fuel vapor canister, and the CPV 161 housed in a purge line 128 of the EVAP system 151, monitoring a decrease in pressure in the fuel system 118 via a fuel tank pressure transducer (FTPT) 191 over a first threshold duration, and in response to the pressure in the fuel system 118 not reducing to a first threshold level (target vacuum level) over the first threshold duration, indicating presence of a degradation in the fuel system 118 and/or the EVAP system 151 of size higher than a threshold size. During the first diagnostic routine, in response to the pressure in the fuel system 118 reducing to the first threshold level over the first threshold duration, the VBV 152 and CPV 161 may be closed, an increase in pressure in the fuel system 118 via the FTPT 191 over a second threshold duration may be monitored, and in response to the pressure in the fuel tank 120 remaining below a second threshold level (upper vacuum threshold) upon completion of the second threshold duration, an absence of degradation in the fuel system 118 and/or the EVAP system 151 may be indicated. In response to the pressure in the fuel tank 120 increasing to the second threshold level during the second threshold duration, the presence of a degradation in the fuel system 118 and/or the EVAP system 151 of size higher than the threshold size, the threshold size corresponding to a size of the orifice 143, may be indicated. If there is an indication of the degradation in the fuel system 118 and/or the EVAP system 151 of size higher than the threshold size and the indication of the degradation in the fuel system 118 and/or the EVAP system 151 of size lower than the threshold size, a second diagnostic routine may be initiated.

The second diagnostic routine may include: closing the CVS 129, opening each of the VBV 152 and the CPV 161, monitoring a decrease in pressure in the fuel system 118 via the FTPT 191 for the first threshold duration, and in response to the pressure in the fuel system 118 not reducing to the first threshold level over the first threshold duration, indicating presence of the degradation at the refueling system 108 higher than the threshold size. During the second diagnostic routine, in response to the pressure in the fuel system 118 reducing to the first threshold level over the first threshold duration, an absence of degradation at the refueling system 108 and presence of a degradation at a different location in the fuel system 118 and/or the EVAP system 151 may be indicated.

In some examples, vehicle 106 may be a hybrid vehicle with multiple sources of torque available to one or more vehicle wheels 55. In other examples, vehicle 106 is a conventional vehicle with an engine, or an electric vehicle with electric machine(s). In the example shown, vehicle 106 includes engine 110 and an electric machine 52. Electric machine 52 may be a motor or a motor/generator. Crankshaft of engine 110 and electric machine 52 are connected via a transmission 54 to vehicle wheels 55 when one or more clutches 56 are engaged. In the depicted example, a first clutch 56 is provided between crankshaft and electric machine 52, and a second clutch 56 is provided between electric machine 52 and transmission 54. Controller 112 may send a signal to an actuator of each clutch 56 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

FIG. 2 shows an example embodiment of a refueling system 108 that is capless. The refueling system 108 includes a cover 200. The cover 200 is configured to enclose components in the system. The refueling system 108 further includes an external housing 202 configured to at least partially enclose various internal components of the refueling system 108. The refueling system 108 further includes an upstream door 204 having a hinge 206. The upstream door 204 is inset from the cover 200. A preloaded upstream spring 208 may be coupled to the upstream door 204 and the external housing 202. The preloaded upstream spring 208 coupled to the upstream door 204 is configured to provide a return force to the door when opened. In this way, the upstream door 204 may close after a fuel nozzle is removed during a refueling event via the return force. Thus, the upstream door 204 automatically closes without assistance from a refueling operator. As a result, the refueling process is simplified.

A seal 210 may be attached to the upstream door 204. Specifically, the seal 210 may extend around the periphery of the upstream door 204, in some examples. When the upstream door 204 is in a closed position the seal may be in face sharing contact with the cover 200. In this way, the evaporative emissions from the refueling system 108 are reduced.

The refueling system 108 further includes a locking lip 212. The locking lip 212 may be configured to receive a portion of a fuel nozzle. In some examples, the locking lip 212 may be provided around at least 100° of the inside circumference of the refueling system 108. The locking lip 212 may influence the positioning and angle of the fuel nozzle axis spout during refueling and therefore has an impact on filling performance.

The refueling system 108 further includes an internal housing 214. The walls of the internal housing 214 may define a nozzle enclosure configured to receive a fuel nozzle. The internal housing 214 may also include a nozzle stop actuator 216 configured to actuate a portion of the fuel nozzle that initiate fuel flow from the fuel nozzle.

An upstream body seal 218 and a downstream body seal 220 may be provided in the refueling system 108 to seal the external housing 202 and various internal components in the refueling system 108. Specifically, the upstream and downstream body seals (218 and 220) are configured to extend between the external housing 202 and the internal housing 214. The upstream body seal 218 and/or downstream body seal 220 may be an O-ring in some examples.

The refueling system 108 further includes a downstream door 222 positioned downstream of the upstream door 204 and the nozzle stop actuator 216. The downstream door 222 includes a hinge 223 and has a preloaded downstream spring 224 coupled thereto. The preloaded downstream spring 224 is coupled to the downstream door 222 providing a return force to the downstream door 222 when opened The downstream spring 224 is also coupled to the external housing 202. The downstream door 222 may also include a seal 226 (e.g., flap seal). The seal 226 may be positioned around the periphery of the downstream door 222, in some examples. The downstream door 222 may reduce evaporative emissions during the refueling process. The downstream door 222 is arranged perpendicularly to the fuel flow when closed, in the depicted example. However, other orientations of the downstream door 222 are possible.

Refueling system 108 may be positioned in a number of configurations in the vehicle 106. In one example, refueling system 108 has a downward gradient. In other words, upstream door 204 is positioned vertically above flow guide 250 with regard to gravitational axis 252. In this way, fuel flow is assisted via gravity during refueling operation.

Refueling system 108 includes flow guide 250 which is arranged downstream of downstream door 222. Refueling system 108 further includes filler neck 254. Flow guide 250 may be at least partially enclosed by filler neck 254. Filler neck 254 is in fluidic contact with fuel tank 104, and filler neck 254 is the same or significantly similar to filler neck 111, as shown in FIG. 1.

Refueling system 108 may further include a vacuum relief mechanism (not shown). The vacuum relief mechanism may allow a passage in the refueling system 108 to open under a threshold vacuum, allowing for the venting of a fuel tank (such as fuel tank 120 of FIG. 1) to atmosphere. In this way, an excess of fuel tank vacuum will cause the vacuum relief mechanism to vent to atmosphere, preventing the fuel tank from collapsing. The vacuum threshold for activating the vacuum relief mechanism may be set at −20 inH$_2$O, for example, or at a suitable threshold depending on the fuel tank design and configuration. In some embodiments, the vacuum relief mechanism may not be an additional hardware component within refueling system 108. Rather, preloaded upstream spring 208 and preloaded downstream spring 224 may be set with a tension such that fuel tank vacuum above a threshold (e.g. −20 inH$_2$O) will cause upstream door 204 and downstream door 222 to open, venting fuel tank 20 to atmosphere. In some embodiments, preloaded upstream spring 208 and preloaded downstream spring 224 may be solenoid activated springs under control of controller 112. When fuel tank vacuum increases above the threshold vacuum (as determined by FTPT 191, for example) controller 112 may deactivate the solenoids, allowing for upstream door 204 and downstream door 222 to open, venting fuel tank 20 to atmosphere. Upon fuel tank vacuum reaching a threshold level, the solenoids may be re-activated.

In this way, the systems of FIGS. 1 and 2 enable a system for an engine 126 in a vehicle 106, which may include a fuel system 118 including a fuel tank 120, refueling system 108 coupled to the fuel tank 120 via each of a recirculation tube 141 and a filler neck 111, the filler neck 111 coupled within the fuel tank 120 via a spud valve 140, an EVAP system 151 coupled to the fuel system 118, and a controller 112 storing instructions in non-transitory memory. The instructions stored in the non-transitory memory when executed, may cause the controller 112 to close a CVS 129 housed in a vent line of an EVAP system 151 when the spud valve 140 is not submerged in fuel within the fuel tank 120, open each of a VBV 152 housed in a fuel vapor line coupling the fuel tank to a fuel vapor canister and a CPV 161 housed in a purge line of the EVAP system 151, and monitor a decrease in pressure in a fuel tank 120 via an FTPT 191 for a first threshold duration. Additionally, the instructions stored in the non-transitory memory when executed may further cause the controller 112 to, in response to the pressure in the fuel system not reducing to a first threshold level over the first threshold duration, indicate presence of a degradation in the refueling system 108 of size higher than a threshold size.

FIGS. 3A-3B show a flow chart of an example method for detecting degradation in an evaporative emissions control (EVAP) system and a fuel system. Method 300 will be described in reference to the systems described herein and with regard to FIGS. 1-2, but it should be understood that similar methods may be applied to other systems without departing from the scope of this disclosure. Method 300 may be carried out by control system 114, and may be stored at controller 112 in non-transitory memory. Instructions for carrying out method 300 may be executed by the controller 112 in conjunction with signals received from sensors of an engine system of the vehicle, such as the sensors described above with reference to FIG. 1. The controller may employ engine actuators of the engine system to adjust operation of an engine of the vehicle, according to the methods described below.

At 301, method 300 may check if conditions are met for a first diagnostic routine for determining a presence of a degradation in the EVAP and/or fuel systems. The first diagnostic routine may be conducted when a spud valve (such as spud valve 140 of FIG. 1) is submerged in fuel contained in a fuel tank (such as fuel tank 120 of FIG. 1). The first diagnostic routine may comprise a negative pressure (vacuum pulldown) portion and a vacuum maintenance (pressure bleed-up) portion in order to determine the presence or absence of a degradation above or below a threshold size, as discussed further herein. A first condition for the first diagnostic routine is that the fuel level (FLI) in the fuel tank as indicated by a fuel level sensor (such as fuel level sensor 134 of FIG. 1) may be above a threshold level. The threshold level of fuel in the fuel tank may be enough to ensure that the spud valve is entirely submerged in fuel, and may be determined by the design of the fuel tank. In one example, if the fuel tank is a top feeding fuel tank, a submerge point of the spud valve may be at 70% fuel capacity of the fuel tank. In another example, if the fuel tank is a bottom feeding tank, the submerge point of the spud valve may be at 30% fuel tank capacity. The controller may use a function calibrated based on tank design and spud valve position within the tank to determine if the spud valve is submerged. The submersion of the spud valve in fuel in the fuel tank may block the path for fuel vapor formed within the fuel tank to flow from the fuel tank to a cap/capless unit (such as cap/capless unit of refueling system 108 of FIG. 1) via a filler neck (such as filler neck 111 of FIG. 1). Blockage of the filler neck by fuel may force pressure release in the fuel system via a degradation at the cap/capless unit to the path from the fuel tank to the cap/capless unit via a recirculation tube (such as recirculation tube 141 of FIG. 1).

Another example condition for initiating the first diagnostic routine may be that a vehicle (such as vehicle 106 of FIG. 1) is operating in a cruise condition such that consistent operating conditions of an engine (such as engine 110 of FIG. 0.1) persist during the first diagnostic routine. The cruise condition may involve the engine being maintained at a constant speed. If the conditions for the first diagnostic routine are not met, method 300 may at 302 continue to maintain current engine operation until the conditions for the first diagnostic routine are met. The method may then end.

If it is determined that conditions are met for carrying out the first diagnostic routine, in order to initiate the routine, at 303, method 300 may proceed to close a canister vent solenoid (such as CVS 129 of FIG. 1). In this way, the EVAP and fuel systems may be isolated from atmosphere.

At 305, method 300 may proceed to maintain open a variable bleed valve (such as VBV 152 of FIG. 1) and additionally open a canister purge valve (such as CPV 161 of FIG. 1). By maintain open the VBV and opening the CPV, a fluidic communication is established between the engine intake manifold, the EVAP system, and the fuel system. Due to the lower pressure at the engine intake manifold (such as intake manifold 144 of FIG. 1), fuel vapors contained within fuel tank and the EVAP system lines may be routed to the intake manifold, thereby generating a region of negative pressure within the vapor space of the fuel tank.

At 307, method 300 may proceed to perform a vacuum pulldown test. In response to routing of the vapor content from the fuel tank and EVAP system into the intake manifold (i.e. application of negative pressure to the fuel tank), a vacuum may form in the vapor space of the fuel tank. Development of the vacuum within the fuel tank may be monitored for a pre-determined, first threshold duration via a pressure sensor (such as FTPT 191 of FIG. 1) coupled to the fuel system. The vacuum level may be monitored over the pre-determined, first threshold duration to detect if the fuel system pressure reduces to a first threshold level (target vacuum level). Both the first threshold level and first threshold duration may be pre-calibrated based on a threshold size of degradation that may be detected through the vacuum pulldown test. As an example, if the threshold size of degradation to be detected is smaller, as for example to comply with stricter emissions standards, the first threshold duration may be increased. The recirculation tube may include the orifice being of the threshold size. In this way, the diameter of the recirculation tube orifice may serve as the distinguishing scale between small and large degradations in the system, and the magnitude of potential degradations may be compared to the threshold size of the recirculation tube orifice.

If the pressure inside the tank doesn't reach the first threshold level within the first threshold duration, it may be inferred that there is a degradation above a threshold size within the EVAP and/or fuel systems. As an example, the vacuum pulldown test may be utilized to determine if there is a degradation greater than a threshold size. As an example, the threshold size, which may be equal to the size of the recirculation tube orifice, may be 0.08" in diameter. With warm fuel, a typical pulldown for a fuel system without degradations may take around 5 seconds, while with cold fuel, a typical vacuum pulldown for a fuel systems without degradation may take around 10 seconds. In this example, the first threshold level may be 8" $H_2O$, and may be achieved in a first threshold duration of 15 seconds. If the first threshold level of 8" $H_2O$ in the fuel tank is not achieved within first threshold duration of 15 seconds, it may be concluded that there exists a degradation of at least 0.08" in diameter within the EVAP and/or fuel systems. However, the values given in the above example are exemplary, and other values for the first threshold level and first threshold duration for a given threshold size of degradation may be chosen.

At 309, method 300 may determine if the first threshold level of the vacuum pulldown test was achieved within the first threshold duration. If it is determined that, during the vacuum pulldown portion of the first diagnostic routine, the first threshold level was not achieved within the first threshold duration, it may be inferred that there is a degradation in the EVAP system and/or the fuel system of size at least of the threshold size of the recirculation tube orifice diameter. Method 300 may then proceed to 310 to record a degradation above a threshold size degradation in the EVAP and/or fuel systems in the non-transitory memory of the controller. Following 310, method 300 may then proceed to 312 to close the VBV and CPV, which may serve to seal the fuel tank from the intake manifold and EVAP system. Method 300 may then proceed to 318 to open the CVS, thereby allowing the pressure of the fuel tank to equilibrate to atmospheric pressure. Method 300 may then proceed to 320, continued in FIG. 3B.

Returning to 309, if the first threshold level of the vacuum pulldown test was achieved within the first threshold duration, it may be inferred that the EVAP system and fuel vapor system do not include a degradation larger in size than the threshold size. The method 300 may then proceed to 311 to close the CPV and the VBV, which may serve to seal the fuel system from the intake manifold and EVAP system. By sealing the fuel system from the intake manifold, the first threshold level attained at the fuel system may be maintained.

At 313, method 300 may then perform a pressure bleed-up test. The pressure bleed-up test may involve monitoring an increase in pressure of the fuel tank (from the first threshold level) via the fuel tank pressure sensor, and then determining if the pressure within the tank increases beyond a second threshold level (upper vacuum threshold) within the tank over a second threshold duration, where the second threshold level is greater than the first threshold level. If the pressure within the fuel tank does not reach the second threshold level within the second threshold duration, it may be inferred that there is no degradation below the threshold size. The second threshold duration may be pre-calibrated based on the threshold size of the diameter of the recirculation tube orifice. The second threshold duration may be set to detect degradations below the threshold size, and the efficacy of detection of degradations below the threshold size may be increased with an increase in the second threshold duration. As an example, a second threshold level may be 4" $H_2O$ in order to detect any degradation less than or equal to the recirculation tube orifice diameter of 0.08" over a threshold duration of 30 seconds, in line with the example given in 307. However, the values given in the above example are exemplary, and other values for the second threshold level and second threshold duration for a given threshold size of degradation may be chosen.

At 315, method 300 may proceed to determine if the second threshold level of the pressure bleed-up test was achieved. If the second threshold level is not achieved within the second threshold duration, no degradation in the EVAP system or fuel system below the threshold size may be detected. As an example, from this result it may be inferred that there is no degradation in the EVAP and fuel systems less than or equal to a threshold size, and engine operation may remain the unadjusted in response to this result. Method 300 may proceed to 317, and a passing test result for the first diagnostic routine may be recorded in the memory of the controller. Method 300 may then proceed to 319 to open the CVS, thereby allowing the pressure of the fuel tank to equilibrate to atmospheric pressure. As an example, since no degradation below the threshold size is detected in the EVAP and fuel systems, further diagnostic routines of the EVAP system and fuel system with the FLI lower than the spud valve may not be desired and a robust EVAP system and fuel system may be indicated. Method 300 may then end.

However, at 315, if it is determined that the fuel system pressure increased to the second threshold level within the second threshold duration, based on the passing of the vacuum pull-down test, it may be inferred that there may be a degradation in the EVAP system and/or fuel system that is less than or equal to the threshold size. The method 300 may then proceed to 316 to record that the second threshold level was reached within the second threshold duration of the pressure bleed-up portion of the first diagnostic routine, indicating that there is a degradation less than or equal to the threshold size within the EVAP and/or fuel systems. Method 300 may then proceed to 318 to open the CVS, thereby allowing the pressure of the fuel tank to equilibrate to atmospheric pressure. Method 300 may then proceed to 320, continued in FIG. 3B.

The method 300 is continued in FIG. 3B. At 320, method 300 may proceed to monitor fuel level (FLI) in the fuel tank to detect if the spud valve is in the fuel vapor space of the fuel tank or submerged in the fuel, as determined by the FLI sensor. The FLI may decrease as a consequence of fuel consumption during engine operation. As mentioned in relation to 301, the FLI may vary depending on the design on the fuel tank.

At 322, method 300 may proceed to determine if conditions are met for the second diagnostic routine to proceed. The second diagnostic routine may be conducted when a spud valve is in the vapor space of the fuel tank and no longer submerged in fuel, and may comprise a negative pressure (vacuum pulldown) in order to determine the presence of a degradation above a threshold size, as discussed further in relation to method 300 of FIG. 3. A condition for the second diagnostic routine to proceed is that the spud valve is in the vapor space of the fuel tank, as mentioned in 320, which may be determined by the FLI, as indicated by the fuel level sensor. Another example condition for initiating may be that a vehicle is operating in a cruise condition such that consistent operating conditions of an engine persist during the second diagnostic routine. The cruise condition may involve the engine being maintained at a constant speed. If the conditions for the second diagnostic routine are not met, method 300 may proceed to 323 to continue monitoring the FLI until it is below the threshold indicating that the spud valve is in the fuel vapor space of the fuel tank, and may then return to 322. Otherwise, method 300 may continue to 324.

In an alternative example, the first and second diagnostic routines may be executed in an opposite order from the method 300 described herein such as if the spud valve is in the vapor space (not submerged), the second diagnostic routine may be first carried out and then upon refueling when the spud valve is submerged in the fuel, the first diagnostic routine is carried out. In a further example, the first and second diagnostic routines may be executed in an alternating fashion (for example, the first diagnostic routine may be executed, then the second diagnostic routine, and then the first diagnostic routine again, or vice versa) for further confidence in the results.

If it is determined that conditions are met for carrying out the second diagnostic routine, in order to initiate the routine, at 324, method 300 may proceed to close the CVS. In this way, the EVAP and fuel systems may be isolated from atmosphere.

At 326, method 300 may proceed to open the VBV and additionally open the CPV. By opening the VBV and the CPV, a fluidic communication is established between the engine intake manifold, the EVAP system, and the fuel system. Due to the lower pressure at the engine intake manifold, fuel vapors contained within fuel tank and the EVAP system lines may be routed to the intake manifold, thereby generating a region of negative pressure within the vapor space of the fuel tank.

At 328, method 300 may proceed to perform a vacuum pulldown test. As mentioned in relation to 307, in response to routing of the vapor content from the fuel tank and EVAP system into the intake manifold (i.e. application of negative pressure to the fuel tank), a vacuum may form in the vapor space of the fuel tank. Development of the vacuum within the fuel tank may be monitored for a pre-determined, first threshold duration via FTPT coupled to the fuel system. The first threshold duration may be the same first threshold duration of 307. The vacuum level may be monitored over the pre-determined, first threshold duration to detect if the fuel system pressure reduces to a first threshold level. Both the first threshold level and first threshold duration may be pre-calibrated based on a threshold size of degradation that may be detected through the vacuum pulldown test. As an example, if the threshold size of degradation to be detected is smaller, for example to comply with more stringent emissions standards, the first threshold duration may be increased. As before in 307, the threshold size of degradation may be set to the diameter of the recirculation tube orifice. In this way, the diameter of the recirculation tube orifice may serve as the distinguishing scale between small and large degradations in the system.

If the pressure inside the tank doesn't reach the first threshold level within the first threshold duration, it may be inferred that there is a degradation above the threshold size within the EVAP and/or fuel systems. As an example, the vacuum pulldown test may be utilized to determine if there is a degradation with a size greater than the threshold size. As an example, the threshold size, which may be equal to the size of the recirculation tube orifice, may be 0.08" in diameter. With warm fuel, a typical pulldown for a fuel system without degradations may take around 5 seconds, while with cold fuel, a typical vacuum pulldown for a fuel systems without degradation may take around 10 seconds. In this example, the first threshold level may be 8" $H_2O$, and may be achieved in a first threshold duration of 15 seconds. If the first threshold level of 8" $H_2O$ in the fuel tank is not achieved within first threshold duration of 15 seconds, it may be concluded that there exists a degradation of at least 0.08" in diameter within the EVAP and/or fuel systems. However, the values given in the above example are exemplary, and other values for the first threshold level and first threshold duration for a given threshold size of degradation may be chosen.

In contrast with 307, in the vacuum pulldown test of 328, the spud valve is above the FLI in the fuel tank, and vapor from the fuel tank may reach the cap/capless unit from the fuel tank via the recirculation tube and via the filler neck of the fuel refilling system. Consequently, since the diameter of the filler neck is larger than the diameter of the recirculation tube orifice, a potential large degradation at the cap/capless unit may no longer be restricted by the diameter of the recirculation tube orifice, as was the case in the pulldown test of 307 and the pressure bleed-up test of 315.

At 330, method 300 may determine if the first threshold level of the vacuum pulldown test was achieved within the first threshold duration. If the first threshold level of the vacuum pulldown test was achieved within the first threshold duration, it may be inferred that the EVAP system and fuel vapor system does not include a degradation larger in size than the threshold size. In particular, unlike in 307, it may be inferred that there is no degradation above threshold size at the cap/capless unit, since a degradation above a threshold size may be detected via the path from the fuel tank to the cap/capless unit via the filler neck. However, in the method 300 as described herein, as the second diagnostic routine may commence if the first diagnostic routine produces a non-passing result either during the vacuum pulldown or pressure bleed-up portions of the first diagnostic routine, a passing result of the vacuum pulldown test may indicate that there is a degradation below the threshold size. Hence, if the vacuum pulldown test produces a passing result, method 300 may proceed to 332 to record a degradation less than or equal to the threshold size in the non-transitory memory of the controller. Additionally, a passing result on the vacuum pulldown test portion of the second diagnostic routine may also indicate that there is no degradation above the threshold size at the cap/capless unit, since it would no longer be restricted by the recirculation tube orifice.

If the vacuum pulldown test of 330 does not pass, then at 331, method 300 may proceed to record in the non-transitory memory of the controller that there is a degradation above the threshold size at the cap/capless unit. The presence of a large degradation located at the cap/capless may be inferred by comparing the results of the first diagnostic routine and the second diagnostic routine. For example, if the sole degradation in the EVAP and fuel systems is a large degradation at the cap/capless unit, then the results of the first diagnostic routine will show a degradation that is equal to the recirculation tube orifice. However, in the second diagnostic routine, as the path from the fuel tank to the cap/capless unit via the filler neck is opened due to the spud valve being in the fuel vapor space, the size of degradation may no longer be restricted by the recirculation tube orifice, as the diameter of the filler neck may be significantly larger than the diameter of the recirculation tube orifice. Hence, the second diagnostic routine may indicate a degradation larger than the recirculation tube orifice located at the cap/capless unit.

As an example, the presence of a degradation may in the case of a refueling system containing a fuel cap (such as fuel cap 105 of FIG. 1) may include the fuel cap not being fully fastened following a refueling event. In response to detection of the presence of the degradation at the refueling system higher than the threshold size, method 300 may further instruct an operator to refasten the fuel cap. As an alternative example, if the refueling system is a capless refueling system (such as the refueling system 108 of FIG. 2), presence of the degradation at the refueling system may include upstream door and/or downstream door (such as upstream door 204 and downstream door 222 of FIG. 2) being stuck open. Following the recording of a degradation above the threshold size at the cap/capless unit, the controller may proceed to alert a vehicle operator via a diagnostic trouble code (DTC) indicator that there is a degradation greater than the threshold size located at the cap/capless unit.

Following 331, method 300 may proceed 333 to close the VBV to seal off the fuel system from the EVAP system, in response to detection of the degradation above the threshold size at the cap/capless unit. This may serve to reduce the possibility of venting of fuel vapors into the atmosphere via the degradation above the threshold size at the cap/capless unit.

Following the either 332 or 333, in response to indication of a degradation in the fuel and/or EVAP systems, method 300 may then continue to 334. At 334, method 300 may adjust engine operating conditions to account for the degradation. In one example, the canister purge schedule may be updated. Therein, in one example, the CPV is held closed and canister purging maintained in a disabled state until degradation of the EVAP and/or fuel systems has been rectified (such as by a service technician resetting the flag). In another example, a first default maximum purge flow is determined for engine operation during the condition when the flag for a degraded EVAP and/or fuel system is set. This first maximum purge flow may be lower than a second maximum purge flow allowed during regular engine operation with no flag set. In response to the indication of degradation of EVAP and/or fuel systems, while operating the vehicle engine, even if a desired purge flow is greater than the first maximum flow, the actual purge flow is restricted to the first maximum purge flow (or a lower value).

Method 300 may then proceed to 336 to close the CPV if it was not already closed during 334, and open the CVS. Closing the CPV may serve to seal off the fuel system from the intake manifold. Further, by opening the CVS, the fuel tank may equilibrate to atmospheric pressure. Method 300 may then end.

In this way, during a first condition, the first vacuum pull-down test and the first pressure bleed-up test may be carried out to detect degradation in the (EVAP) system and/or fuel system, and during the second condition, the second vacuum pull-down test may be carried out to detect degradation in the refueling system. The first condition may include the spud valve coupled to an end of the filler neck being submerged in fuel within the fuel tank, and the second condition may include the spud valve exposed to fuel vapor space within the fuel tank and not submerged in fuel.

FIG. 4 shows an example timeline 400 for identifying degradations within an EVAP and/or fuel system (such as EVAP system 151 and fuel system 118 of FIG. 1). The example timeline 400 is for a degradation at a cap/capless unit (such as cap/capless unit of refueling system 108 of FIG. 1) that is above a threshold size. The horizontal (x-axis) denotes time and the vertical markers $t_1$-$t_5$ identify significant times the diagnostic routines.

Timeline 400 includes a first plot 402 of the pressure in a fuel tank (such as fuel tank 120 of FIG. 1) as estimated via a fuel tank pressure transducer (such as FTPT 191 of FIG. 1) As part of a first and second diagnostic routines for identifying a degradation in the EVAP and/or fuel systems, the pressure in the fuel tank can be compared over a first threshold duration to a first threshold level (target vacuum level) as part of a vacuum pulldown test, depicted by dashed line 406. The pressure in the fuel tank can be compared over a second fixed threshold duration to a second threshold level (upper vacuum threshold), depicted here by dashed line 404. Each of the first threshold level and the second threshold level are pre-calibrated based on fuel system and EVAP system characteristics and experiments carried out with a new fuel system and EVAP system. The canister purge valve and variable bleed valve (such as CPV 161 and VBV 152 of FIG. 1) operate during diagnostic routines for identifying degradations in the EVAP and/or fuel systems, which may serve to isolate and purge the fuel tank, and are depicted by plots 408 and 410, respectively. Complementarily, canister vent solenoid (such as CVS 129 of FIG. 1) operation during diagnostic routines for identifying degradations in the EVAP and/or fuel systems, which may serve to isolate and equilibrate the EVAP and fuel systems with the atmosphere, is depicted by plot 412. During timeline 400, the engine is combusting, and correspondingly will consume fuel from the fuel tank. Fuel level input (FLI) is shown in plot 414. Dashed line 416 depicts a threshold level of fuel below which it is inferred that the spud valve is no longer submerged in fuel and the second diagnostic routine may commence. Plot 422 depicts indication of a degradation in the EVAP and/or fuel systems based on the first and second diagnostic routines. The degradation may be a small degradation, a large degradation, and a large degradation located at a cap/capless unit; the indication for a small degradation is given by dashed line 420, and the indication for a large degradation at the cap/capless unit is given by dashed line 418.

Prior to $t_1$, the engine is operating under a cruise condition, the CPV is closed and the VBV is open as shown in plots 408 and 410 respectively, and the CVS is venting to atmosphere as shown in plot 412. The FLI as shown in plot 414 is above the threshold level which may indicate that a spud valve (such as spud valve 140 of FIG. 1) is submerged in fuel in the fuel tank in order to proceed with the first diagnostic routine as shown by dashed line 416, and the first diagnostic routine commences.

At $t_1$, in order to initiate the first diagnostic routine, the CVS is actuated to a closed position as depicted in plot 412, isolating the EVAP and fuel systems from atmosphere. Further, at $t_1$, the CPV is actuated to an open position as shown in plot 408, thereby establishing fluidic communication between the intake manifold and the fuel system via the EVAP system. Air from the EVAP system and the fuel system is drawn into the intake manifold (such as intake manifold 144 of FIG. 1) due to the lower pressure at the intake manifold, thereby generating a lower, negative pressure in the fuel tank, and the vacuum pulldown portion of the first diagnostic routine begins.

From $t_1$ to $t_2$, due to the open states of the CPV and VBV, the fuel system is evacuated and the pressure in the fuel tank begins to drop, as shown in plot 402. Over the time interval from $t_1$ to $t_2$, the fuel tank pressure further drops, reaching the first threshold level at $t_2$ prior to completion of the first threshold duration, thereby indicating no presence of a degradation above a threshold size of a diameter of a recirculation tube orifice (such as the orifice 143 of recirculation tube 141 of FIG. 1) in the fuel system and/or the EVAP system.

At $t_2$, the vacuum pulldown test concludes with no indication of a degradation of above a threshold size. Consequently, the indication of a degradation as shown by plot 422 remains in the state indicating no degradation in the EVAP and/or fuel system. Additionally, in response to conclusion of the vacuum pulldown test, the CVP and VBV are actuated to their respective closed positions, as shown in plots 408 and 410, respectively, isolating the fuel tank, and the pressure bleed-up portion of the first diagnostic routine commences.

From $t_2$ to $t_3$, due to possible imperfect isolation of the fuel tank, the pressure within the fuel tank as shown in 402 increases, and at $t_3$, intersects the second threshold level as shown by dashed line 404 before the second threshold duration is finished. At time $t_3$, in response to the pressure in the fuel tank reaching the second threshold level, a degradation less than or equal to the threshold degradation size is indicated, as shown by plot 422 intersecting dashed line 420, and the pressure bleed-up test concludes. Subsequently, in response to the conclusion of the pressure bleed-up portion of the first diagnostic routine, at time $t_3$, the CVS as shown by plot 412 is actuated to an open position, in order to maintain normal engine operation during the cruise condition.

From $t_3$ to $t_4$, the FLI as shown in plot 414 decreases due to engine operation in the cruise condition, and is monitored until it crosses the threshold amount of fuel which may indicate that the spud valve is in the vapor space of the fuel tank in order to proceed with the second diagnostic routine, as shown by dashed line 416. Concomitantly, the pressure in the fuel tank as shown by plot 402 continues to increase due to imperfect isolation of the sealed fuel tank maintained during the cruise condition.

At $t_4$, the amount of FLI as shown by plot 414 intersects dashed line 416, indicating the threshold FLI has been reached and that a spud valve is in the vapor space of the fuel tank, and the second diagnostic routine commences. In order to initiate the second diagnostic routine, the CVS is actuated to the closed position as shown in plot 412, thereby isolating the EVAP and fuel systems from the atmosphere. Additionally in response to beginning the second diagnostic routine, CPV and VBV are actuated to their open positions, as shown in plots 408 and 410 respectively, thereby establishing fluidic communication between the intake manifold and the fuel system via the EVAP system. Air from the EVAP system and the fuel system are drawn to the intake manifold due to the lower pressure at the intake manifold thereby generating a negative pressure in the fuel tank and purging the air and fuel vapor charge into an intake manifold.

From $t_4$ to $t_5$, due to the opening of the CPV and VBV as shown in plots 408 and 410 respectively, the pressure in the fuel tank begins to drop, as shown in plot 402. Due to the opening of a path from the fuel tank to the cap/capless unit via a filler neck (such as filler neck 111 of FIG. 1), which has a diameter significantly larger than the diameter of the orifice of the recirculation tube, the large degradation at the cap/capless unit is no longer restricted by the size of the recirculation tube orifice. Consequently, the pressure in the fuel tank, as shown in plot 402, decreases more slowly from $t_4$ to $t_5$ than from $t_1$ to $t_2$, and ultimately the pressure in the fuel tank does not reach the first threshold level within the first threshold duration.

At $t_5$, in response to the fuel tank pressure shown in plot 402 not reaching the first threshold level within the first threshold duration, the vacuum pulldown test of the second diagnostic routine concludes with a negative result, indicating presence of a degradation at the cap/capless unit above a threshold size, as indicated by plot 422 intersecting dashed line 418. Due to the conclusion of the vacuum pulldown test, the CPV and VBV are actuated to their closed positions, as shown in plots 408 and 410, respectively. Further, at $t_5$, the CVS reopens as shown in plot 412, causing the pressure in the fuel tank as shown in plot 402 begin to equilibrate to atmospheric pressure.

FIG. 5 shows an example table 500 for inferring a result of a first or second diagnostic routine to identify a degradation in an EVAP and/or fuel system (such as EVAP system 151 and fuel system 118 of FIG. 1). Example table 500 may be populated based on a method for diagnosing degradation in the EVAP and/or fuel systems, such as method 300, and shows conditions that may be inferred from the diagnostics of method 300.

Row 501 describes conditions that may be inferred upon passing of a vacuum pulldown portion of the first diagnostic routine. As described in relation to 307, a passing of the vacuum pulldown test portion of the first diagnostic routine may be indicated through pressure in a fuel tank (such as fuel tank 120 of FIG. 1) reaching a first threshold level (target vacuum level) within a first threshold duration. If the vacuum pulldown portion of the first diagnostic routine passes, then it may be inferred that there is no degradation in the EVAP and/or fuel systems above a threshold size of the recirculation tube orifice (such as orifice 143 of recirculation tube 141 of FIG. 1), with possible exception of a degradation above a threshold size at a cap/capless unit (such as the cap/capless unit of refueling system 108 of FIGS. 1-2). A degradation above the threshold size at the cap/capless unit may be restricted by the recirculation tube orifice, and hence may still be present, even if there is a pass on the vacuum pulldown test of the first diagnostic routine.

Row 503 describes conditions that may be inferred upon a non-passing result for the vacuum pulldown portion of the first diagnostic routine. As described in relation to 307, the vacuum pulldown test portion of the first diagnostic routine may not pass if pressure in the fuel tank does not reach the first threshold level within the first threshold duration. If the vacuum pulldown portion of the first diagnostic routine does not pass, then it may be inferred that there is a degradation in the EVAP and/or fuel systems above the threshold size of the recirculation tube orifice. Since a degradation above the threshold size at the cap/capless unit is restricted by the recirculation tube orifice, a non-passing test result on the vacuum pulldown portion of the first diagnostic routine indicates that there is a degradation above threshold size elsewhere in the EVAP and/or fuel systems.

Row 505 describes conditions that may be inferred upon passing of a pressure bleed-up portion of the first diagnostic routine. As described in relation to 313, a pass on the pressure bleed-up portion of the first diagnostic routine may be indicated by pressure in the fuel tank not reaching a second threshold level (upper vacuum level) within a second threshold duration. If the pressure bleed-up portion of the first diagnostic routine passes, then it may be inferred that there is no degradation in the EVAP and/or fuel systems that can be detected within a first threshold duration, and that is less than or equal to than a threshold size of the recirculation tube orifice. In one example, there may be no degradation in the EVAP and/or fuel systems.

Row 507 describes conditions that may be inferred upon a non-passing result of a pressure bleed-up portion of the first diagnostic routine. As described in relation to 313, the pressure bleed-up portion of the first diagnostic routine may not pass if the pressure in the fuel tank reaches a second threshold level within the second threshold duration. If the pressure bleed-up portion of the first diagnostic routine does not pass, then it may be inferred that there may be a degradation somewhere in the EVAP and/or fuel systems less than or equal to the threshold size. Additionally, it may be inferred that there could also be a degradation greater than the threshold size at the cap/capless unit, which is restricted by the diameter of the recirculation tube orifice. As an example, if the sole degradation in the system is a degradation greater than the threshold size at the cap/capless unit (for example due to insufficient sealing of a fuel cap), the vacuum pulldown portion of the first diagnostic routine may pass while the pressure bleed-up portion of the first diagnostic routine may not pass, and the method 300 will have to go to the second diagnostic to further determine the location of the degradation in the EVAP and/or fuel systems.

Row 509 describes conditions that may be inferred upon passing on a vacuum pulldown test of the second diagnostic routine. As described in relation to 328, a pass on the vacuum pulldown test portion of the second diagnostic routine may be indicated through pressure in the fuel tank reaching a first threshold level within the first threshold duration. As indicated in method 300, the second diagnostic routine may proceed after the first diagnostic routine, either from a non-passing result on the vacuum pulldown portion or a non-passing result on the pressure bleed-up portion. If the vacuum pulldown portion of the test passes, then it may be inferred that there is a degradation in the EVAP and/or fuel systems less than or equal to the threshold size. In comparison to the results of the first diagnostic routine, a pass on the vacuum pulldown portion of the second diagnostic routine may indicate the absence of a degradation greater than the threshold size at the cap/capless unit, whereas in the first diagnostic routine, the absence of a degradation greater than a threshold size may be inferred from a pass on the vacuum bleed-up test, which may be the case if no degradation is detected within a first threshold duration.

Row 511 describes conditions that may be inferred upon a non-passing result on a vacuum pulldown test of the second diagnostic routine. As indicated in method 300, the second diagnostic routine may proceed after the first diagnostic routine, either from a non-passing result on the vacuum pulldown portion or a non-passing result on the pressure bleed-up portion. As described in relation to 328, a non-passing result on the vacuum pulldown test portion of the second diagnostic routine may be indicated through pressure in the fuel tank not reaching the first threshold level within the first threshold duration. As an example, if the vacuum pulldown test of the first diagnostic routine passes, the pressure bleed-up test of the first diagnostic routine does not pass, and the vacuum pulldown test of the second diagnostic routine does not pass, it may be inferred that there is a large degradation at the cap/capless unit, which was previously restricted by the size of a recirculation tube orifice during the first diagnostic routine.

In this way, utilization of a first condition for EVAP and fuel system diagnostics, where the spud valve is submerged in fuel in the fuel tank and a second condition for EVAP and fuel system diagnostics, where the spud valve is in the fuel vapor space of the fuel tank, may allow for identification of large degradations at the cap/capless unit of the refueling system. In particular, the results of diagnostic routines under first and second conditions may be compared, and if the results from the first diagnostic routine differ from the results of the second diagnostic routine, it may be inferred that there is a degradation above a threshold size of the diameter of a recirculation tube orifice at the cap/capless unit. The method may also allow distinguishing between large degradations at the cap/capless unit and elsewhere in the EVAP and/or fuel systems, by comparison of the vacuum pulldown tests of the first and second diagnostic routines. Identification of large degradations at the cap/capless may allow the vehicle operator to more easily identify sealing errors at the cap/capless unit which may be easily dealt with, and may allow the vehicle operator to avoid costly and time consuming in-shop degradation testing to identify the location of the degradation in the EVAP and/or fuel system.

The disclosure also provides support for a method for an engine, comprising: indicating a presence or absence of a degradation at a refueling system based on a position of a spud valve with a fuel tank relative to a level of fuel in the fuel tank. In a first example of the method, the spud valve is coupled to an end of a filler neck coupling the refueling system to the fuel tank, the refueling system further coupled to the fuel tank via a recirculation tube including an orifice. In a second example of the method, optionally including the first example, detecting the presence or absence of the degradation at the refueling system is based on one or more of a first diagnostic routine carried out when the level of fuel in the fuel tank is higher than a position of the spud valve in the fuel tank and a second diagnostic routine carried out when the level of fuel in the fuel tank is lower than the position of the spud valve in the fuel tank. In a third example of the method, optionally including one or both of the first and second examples, the first diagnostic routine includes: closing a canister vent solenoid valve (CVS) housed in a vent line of an evaporative emissions control (EVAP) system, maintaining open a vapor block valve (VBV) housed in a fuel vapor line coupling the fuel tank to a fuel vapor canister, and opening a canister purge valve (CPV) housed in a purge line of the EVAP system, monitoring a decrease in pressure in a fuel system via a fuel tank pressure transducer (FTPT) over a first threshold duration, and in response to the pressure in the fuel system not reducing to a first threshold level over the first threshold duration, indicating presence of a degradation in the fuel system and/or the EVAP system of size higher than a threshold size. In a fourth example of the method, optionally including one or more or each of the first through third examples, during the first diagnostic routine, in response to the pressure in the fuel system reducing to the first threshold level over the first threshold duration, closing each of the VBV and the CPV, monitoring an increase in pressure in the fuel system via the FTPT over a second threshold duration, and in response to the pressure in the fuel tank remaining below a second threshold level upon completion of the second threshold duration, indicating an absence of degradation in the fuel system and/or the EVAP system of size. In a fifth example of the method, optionally including one or more or each of the first through fourth examples, the method further comprises: in response to the pressure in the fuel tank remaining increasing to the second threshold level during the second threshold duration, indicating presence of a degradation in the fuel system and/or the EVAP system of size higher than the threshold size, the threshold size corresponding to a size of the orifice. In a sixth example of the method, optionally including one or more or each of the first through fifth examples, the method further comprises: in response to one of an indication of the degradation in the fuel system and/or the EVAP system of size higher than the threshold size and the indication of the degradation in the fuel system and/or the EVAP system of size lower than the threshold size, initiating the second diagnostic routine. In a seventh example of the method, optionally including one or more or each of the first through sixth examples, the second diagnostic routine includes: closing the CVS, opening each of the VBV and the CPV, monitoring a decrease in pressure in the fuel system via the FTPT for the first threshold duration, and in response to the pressure in the fuel system not reducing to the first threshold level over the first threshold duration, indicating presence of the degradation at the refueling system higher than the threshold size. In an eighth example of the method, optionally including one or more or each of the first through seventh examples, the method further comprises: during the second diagnostic routine, in response to the pressure in the fuel system reducing to the first threshold level over the first threshold duration, indicating absence of degradation at the refueling system and presence of a degradation at a different location in the fuel system and/or the EVAP system. In a ninth example of the method, optionally including one or more or each of the first through eighth examples, the method further comprises: in response to detection of the presence of the degradation at the refueling system higher than the threshold size, reducing an opening of the VBV and updating a purge schedule of the fuel vapor canister. In a tenth example of the method, optionally including one or more or each of the first through ninth examples, the refueling system includes a fuel cap, and the presence of the degradation at the refueling system includes the fuel cap not being fully fastened following an refueling event, the method further comprising, in response to detection of the presence of the degradation at the refueling system higher than the threshold size, instructing an operator to refasten the fuel cap. In a eleventh example of the method, optionally including one or more or each of the first through tenth examples, the refueling system is a capless fuel system including an upstream door and a downstream door, and the presence of the degradation at the refueling system includes the upstream door and/or the downstream door being stuck open.

The disclosure also provides support for a method for an engine, comprising: during a first condition, carrying out a first vacuum pull-down test and a first pressure bleed-up test to detect degradation in an evaporative emissions control (EVAP) system and/or a fuel system, and during a second condition, carrying out a second vacuum pull-down test to detect degradation in a refueling system. In a first example of the method, the first condition includes a spud valve coupled to an end of a filler neck being submerged in fuel within a fuel tank, and wherein the second condition includes the spud valve exposed to fuel vapor space within the fuel tank and not submerged in fuel. In a second example of the method, optionally including the first example, the fuel tank is coupled to the refueling system via each of the filler neck and a recirculation tube including an orifice. In a third example of the method, optionally including one or both of the first and second examples, the first vacuum pull-down test includes closing a canister vent solenoid valve (CVS) housed in a vent line of an EVAP system, maintaining open a vapor block valve (VBV) housed in a fuel vapor line coupling the fuel tank to a fuel vapor canister, and opening a canister purge valve (CPV) housed in a purge line of the EVAP system, monitoring a decrease in pressure in a fuel system via a fuel tank pressure transducer (FTPT) for a first threshold duration, in response to the pressure in the fuel system not reducing to a first threshold level over the first threshold duration, indicating presence of a degradation in the fuel system and/or the EVAP system of size higher than a threshold size, and wherein the first pressure bleed-up test includes closing each of the VBV and the CPV, monitoring an increase in pressure in the fuel system via the FTPT over a second threshold duration, and in response to the pressure in the fuel increasing to a second threshold level during the second threshold duration, indicating presence of a degradation in the fuel system and/or the EVAP system of size higher than the threshold size, the threshold size corresponding to a size of an orifice. In a fourth example of the method, optionally including one or more or each of the first through third examples, the second vacuum pull-down test includes, in response to indication of presence of the degradation in the fuel system and/or the EVAP system based on the first vacuum pull-down test or the first pressure bleed-up test, closing the CVS, opening each of the VBV and the CPV, monitoring the decrease in pressure in the fuel system over the first threshold duration, and in response to the pressure in the fuel system not reducing to the first threshold level over the first threshold duration, indicating a presence of a degradation greater than the threshold size at the refueling system.

The disclosure also provides support for a system for an engine in a vehicle, comprising: a fuel system including a fuel tank, a refueling system coupled to the fuel tank via each of a recirculation tube and a filler neck, the filler neck coupled within the fuel tank via a spud valve, an evaporative emissions control system coupled to the fuel system, and a controller storing instructions in non-transitory memory that, when executed, cause the controller to: when the spud valve is not submerged in fuel within the fuel tank, close a canister vent solenoid valve (CVS) housed in a vent line of an EVAP system, open each of a vapor block valve (VBV) housed in a fuel vapor line coupling the fuel tank to a fuel vapor canister, and a canister purge valve (CPV) housed in a purge line of the EVAP system, monitor a decrease in pressure in a fuel system via a fuel tank pressure transducer (FTPT) for a first threshold duration, and in response to the pressure in the fuel system not reducing to a first threshold level over the first threshold duration, indicate presence of a degradation in the refueling system of size higher than a threshold size. In a first example of the system, the controller includes further instruction to: when the spud valve is not submerged in the fuel within the fuel tank, close the CVS, open each of the VBV and the CPV, monitor the decrease in pressure in the fuel system via the FTPT over the first threshold duration, and in response to the pressure in the fuel system not reducing to the first threshold level over the first threshold duration, indicate presence of a degradation in the fuel system and/or the EVAP system higher than the threshold size. In a second example of the system, optionally including the first example, a recirculation system includes an orifice of the threshold size.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a controller storing instructions in non-transitory memory that, when executed, cause the controller to distinguish between improper sealing of a fuel cap versus a degradation due to damage in an evaporative emissions control (EVAP) system and a fuel system, including instructions to indicate a presence or an absence of a degradation at a refueling system based on a position of a spud valve within a fuel tank relative to a level of fuel in the fuel tank, the refueling system including a filler neck coupled to the spud valve, wherein the stored instructions further include instructions where the indicating of the presence or absence of the degradation at the refueling system is based on each of a first diagnostic routine carried out when the level of fuel in the fuel tank is higher than the position of the spud valve in the fuel tank and a second diagnostic routine carried out when the level of fuel in the fuel tank is lower than the position of the spud valve in the fuel tank, the first diagnostic routine including both a pulldown test and a bleed-up test, and the second diagnostic routine including only the pulldown test.

2. The system of claim 1, wherein the spud valve is coupled to an end of the filler neck coupling the refueling system to the fuel tank, the refueling system further coupled to the fuel tank via a recirculation tube including an orifice.

3. The system of claim 2, wherein the stored instructions further include, for the first diagnostic routine, instructions for:
closing a canister vent solenoid valve (CVS) housed in a vent line of the EVAP system;
maintaining open a vapor block valve (VBV) housed in a fuel vapor line coupling the fuel tank to a fuel vapor canister, and opening a canister purge valve (CPV) housed in a purge line of the EVAP system;
monitoring a decrease in pressure in the fuel system via a fuel tank pressure transducer (FTPT) over a first threshold duration; and
in response to the pressure in the fuel system not reducing to a first threshold level over the first threshold duration, indicating the degradation in the fuel system and the EVAP system and that the degradation is of a size larger than a threshold size.

4. The system of claim 3, wherein the stored instructions further include instructions for, during the first diagnostic routine, in response to the pressure in the fuel system reducing to the first threshold level over the first threshold duration, closing each of the VBV and the CPV, monitoring an increase in pressure in the fuel system via the FTPT over a second threshold duration, and in response to the pressure in the fuel tank remaining below a second threshold level upon completion of the second threshold duration, indicating an absence of a degradation in the fuel system and/or the EVAP system.

5. The system of claim 4, wherein the stored instructions further include instructions for, in response to the pressure in the fuel tank increasing to the second threshold level during the second threshold duration, indicating the degradation in the fuel system and the EVAP system and that the degradation is of the size larger than the threshold size, the threshold size corresponding to a size of the orifice.

6. The system of claim 5, wherein the stored instructions further include instructions for, in response to one of an indication of the degradation in the fuel system and the EVAP system of the size larger than the threshold size and an indication of the degradation in the fuel system and the EVAP system of a size smaller than the threshold size, initiating the second diagnostic routine.

7. The system of claim 6, wherein the instructions further include, for the second diagnostic routine, instructions for:
closing the CVS;
opening each of the VBV and the CPV;
monitoring a decrease in pressure in the fuel system via the FTPT for the first threshold duration; and
in response to the pressure in the fuel system not reducing to the first threshold level over the first threshold duration, indicating the presence of the degradation at the refueling system of the size larger than the threshold size.

8. The system of claim 7, wherein the stored instructions further include instructions for, during the second diagnostic routine, in response to the pressure in the fuel system reducing to the first threshold level over the first threshold duration, indicating the absence of the degradation at the refueling system and indicating the presence of the degradation at a different location in the fuel system and the EVAP system.

9. The system of claim 7, wherein the stored instructions further include instructions for, in response to detection of the presence of the degradation at the refueling system of larger than the threshold size, reducing an opening of the VBV and updating a purge schedule of the fuel vapor canister.

10. The system of claim 7, wherein the presence of the degradation at the refueling system includes the fuel cap not being fully fastened following a refueling event, the stored instructions further comprising instructions for, in response to detection of the presence of the degradation at the refueling system of larger than the threshold size, instructing an operator to refasten the fuel cap.

11. A system for an engine, comprising:
a controller storing instructions in non-transitory memory that, when executed, cause the controller to:
during a first condition, carry out a first vacuum pull-down test and a first pressure bleed-up test to detect degradation in an evaporative emissions control (EVAP) system having a purge line and/or a fuel system having a fuel tank; and
during a second condition, carry out a second vacuum pull-down test and not a second bleed-up test to detect degradation in a refueling system,
wherein the first condition includes a spud valve coupled to an end of a filler neck being submerged in fuel within the fuel tank, and wherein the second condition includes the spud valve exposed to fuel vapor space within the fuel tank and not submerged in fuel.

12. The system of claim 11, wherein the fuel tank is coupled to the refueling system via each of the filler neck and a recirculation tube including an orifice.

13. The system of claim 11, wherein the first vacuum pull-down test includes closing a canister vent solenoid valve (CVS) housed in a vent line of the EVAP system; maintaining open a vapor block valve (VBV) housed in a fuel vapor line coupling the fuel tank to a fuel vapor canister, and opening a canister purge valve (CPV) housed in the purge line of the EVAP system; monitoring a decrease in pressure in the fuel system via a fuel tank pressure transducer (FTPT) for a first threshold duration; in response to the pressure in the fuel system not reducing to a first threshold level over the first threshold duration, indicating a presence of a degradation of a size larger than a threshold size in the fuel system and/or the EVAP system; and
wherein the first pressure bleed-up test includes closing each of the VBV and the CPV, monitoring an increase in pressure in the fuel system via the FTPT over a second threshold duration, and in response to the pressure in the fuel system increasing to a second threshold level during the second threshold duration, indicating the presence of the degradation of the size larger than the threshold size in the fuel system and/or the EVAP system, the threshold size corresponding to a size of an orifice.

14. The system of claim 13, wherein the second vacuum pull-down test includes, in response to the indication of the presence of the degradation in the fuel system and/or the EVAP system based on the first vacuum pull-down test or the first pressure bleed-up test, closing the CVS, opening each of the VBV and the CPV, monitoring the decrease in pressure in the fuel system over the first threshold duration, and in response to the pressure in the fuel system not reducing to the first threshold level over the first threshold duration, indicating the presence of the degradation of the size larger than the threshold size at the refueling system.

\* \* \* \* \*